US012284473B1

(12) United States Patent
Zhao et al.

(10) Patent No.: US 12,284,473 B1
(45) Date of Patent: Apr. 22, 2025

(54) MEMS MICROPHONE

(71) Applicant: AAC ACOUSTIC TECHNOLOGIES (SHENZHEN) CO., LTD., Shenzhen (CN)

(72) Inventors: Zhuanzhuan Zhao, Shenzhen (CN); Kaijie Wang, Shenzhen (CN); Linlin Wang, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/923,608

(22) PCT Filed: Aug. 25, 2022

(86) PCT No.: PCT/CN2022/114905
§ 371 (c)(1),
(2) Date: Nov. 7, 2022

(87) PCT Pub. No.: WO2024/000773
PCT Pub. Date: Jan. 4, 2024

(30) Foreign Application Priority Data

Jul. 1, 2022 (CN) ........................ 202221705318.6

(51) Int. Cl.
*H04R 1/08* (2006.01)

(52) U.S. Cl.
CPC ......... *H04R 1/08* (2013.01); *H04R 2201/003* (2013.01)

(58) Field of Classification Search
CPC .... H04R 1/08; H04R 2201/003; H04R 19/00; H04R 19/005; H04R 19/02
See application file for complete search history.

(56) References Cited

U.S. PATENT DOCUMENTS

2010/0084721 A1* 4/2010 Wu ........................ H10D 1/692 257/E29.324
2023/0217191 A1* 7/2023 Tong ...................... H04R 19/04 381/174

* cited by examiner

*Primary Examiner* — Tuan D Nguyen
(74) *Attorney, Agent, or Firm* — Wiersch Law Group

(57) ABSTRACT

The present disclosure discloses a MEMS microphone, including: a substrate including a back cavity; a capacitive system arranged on the substrate, the capacitive system including a back plate and a diaphragm opposite to the back plate; wherein the diaphragm includes a vibration portion and a fixing portion surrounding the vibration portion and fixed to the substrate, the vibration portion and the fixing portion are spaced apart from each other by a slit, the fixing portion includes a plurality of releasing portions, and the releasing portions pass through the fixing portion. Compared with the related art, MEMS microphone disclosed by the present disclosure has a high reliability of the back plate.

10 Claims, 4 Drawing Sheets

MEMS MICROPHONE

FIELD OF THE PRESENT DISCLOSURE

The present disclosure relates to a field of sound-electric conversion technology, in particular to a micro-electro-mechanical system (MEMS) microphone.

DESCRIPTION OF RELATED ART

With rapid development of the mobile communication technology in recent years, mobile communication devices such as portable phones, portable phones capable of accessing Internet, personal digital assistants and other devices that perform communication specially utilizing communication networks are used more and more. A microphone, especially a MEMS microphone, is one of the most important units used in the above-described devices.

A micro-electro-mechanical system (MEMS) microphone is an electroacoustic transducer produced by micro-mechanical technology, with small volume, excellent frequency response characteristic, low noise and the like. As electronic devices are getting miniaturized, lightened and thinned, MEMS microphones are increasingly widely used in those devices.

The MEMS microphone in the related art includes a substrate with a back cavity and a capacitor system arranged on the substrate, the capacitor system includes a back plate and a diaphragm arranged opposite to the back plate. In the manufacturing process of MEMS microphone, if the oxide between the diaphragm and the back plate is not cleaned, the reliability of the back plate will be affected. Usually, a release hole is added around the outer ring of the back plate hole of the back plate, and the oxide etchant enters from the release hole to clean the oxide between the diaphragm and the back plate, but this will make the MEMS microphone more venting channels, for the MEMS microphone with sound input from the top, the signal-to-noise ratio is reduced; for the MEMS microphone with sound input from the bottom, the low attenuation is affected.

Thus, it is necessary to provide a MEMS microphone to solve the problem.

SUMMARY OF THE DISCLOSURE

In the view of the above, an objective of the present disclosure is to provide a MEMS microphone with a high reliability of the back plate.

In order to achieve the objective mentioned above, the present disclosure discloses a MEMS microphone, including: a substrate including a back cavity; a capacitive system arranged on the substrate, the capacitive system including a back plate and a diaphragm opposite to the back plate; wherein the diaphragm includes a vibration portion and a fixing portion surrounding the vibration portion and fixed to the substrate, the vibration portion and the fixing portion are spaced apart from each other by a slit, the fixing portion includes a plurality of releasing portions, and the releasing portions pass through the fixing portion.

Further, a plurality of through holes forms the releasing portions, and the plurality of through holes is evenly distributed in the fixing portion.

Further, a cross section of each through hole perpendicular to a vibration direction of the diaphragm is circular.

Further, a cross section of each through hole perpendicular to a vibration direction of the diaphragm is elliptical.

Further, each through hole extends toward a center of the diaphragm.

Further, each through hole includes a plurality of through portions which communicates with each other in sequence, each through portion includes a first through portion, a second through portion, a third through portion, a fourth through portion that communicates with the first through portion and the second through portion, and a fifth through portion that communicates with the second through portion and the third through portion, the fourth through portion and the fifth through portion are respectively located on both sides of the second through portion.

Further, the first through portion, the second through portion and the third through portion are parallel to each other.

Further, the fourth through portion and the fifth through portion are perpendicular to the second through portion.

Further, the diaphragm is in a shape of a racetrack, corners of the fixing portion are provided with a plurality of circular holes, and the through portions are located on a long axis side and a short axis side of the diaphragm.

Further, the diaphragm is located on a side of the back plate close to the substrate.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
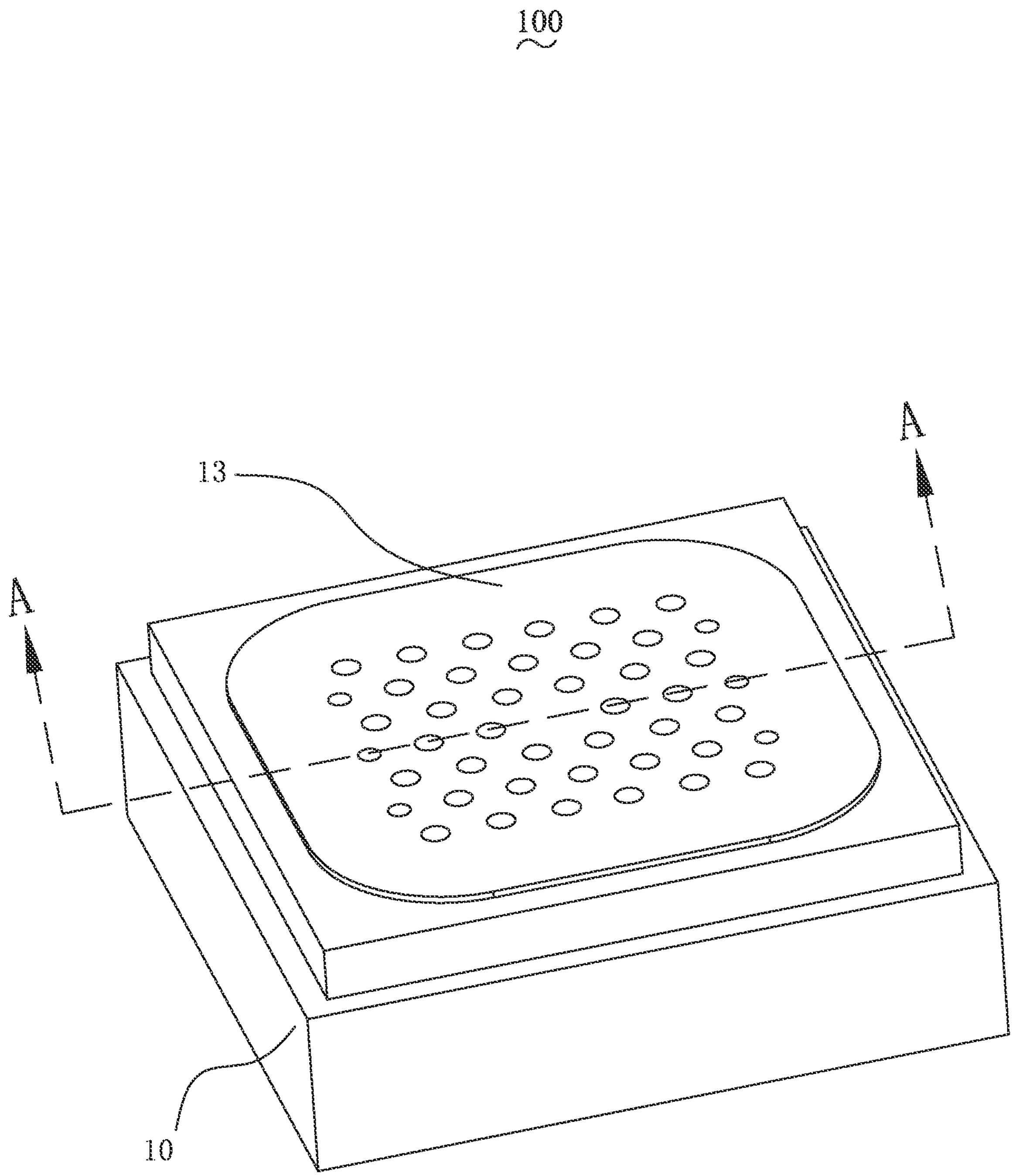
FIG. 1 is an isometric view of a MEMS microphone in accordance with a first embodiment.
Figure 2:
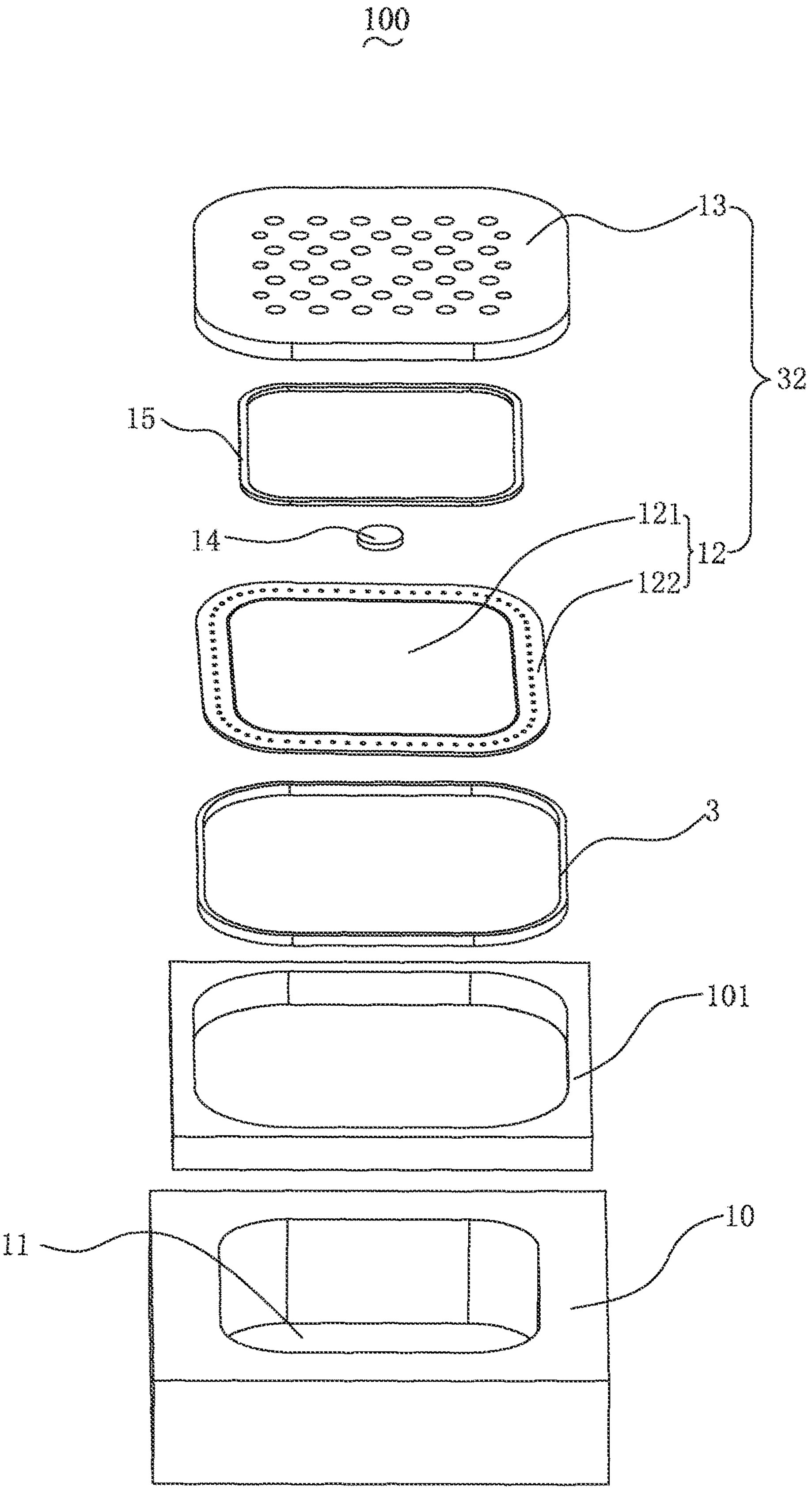
FIG. 2 is an exploded view of the MEMS microphone in accordance with the first embodiment.
Figure 3:
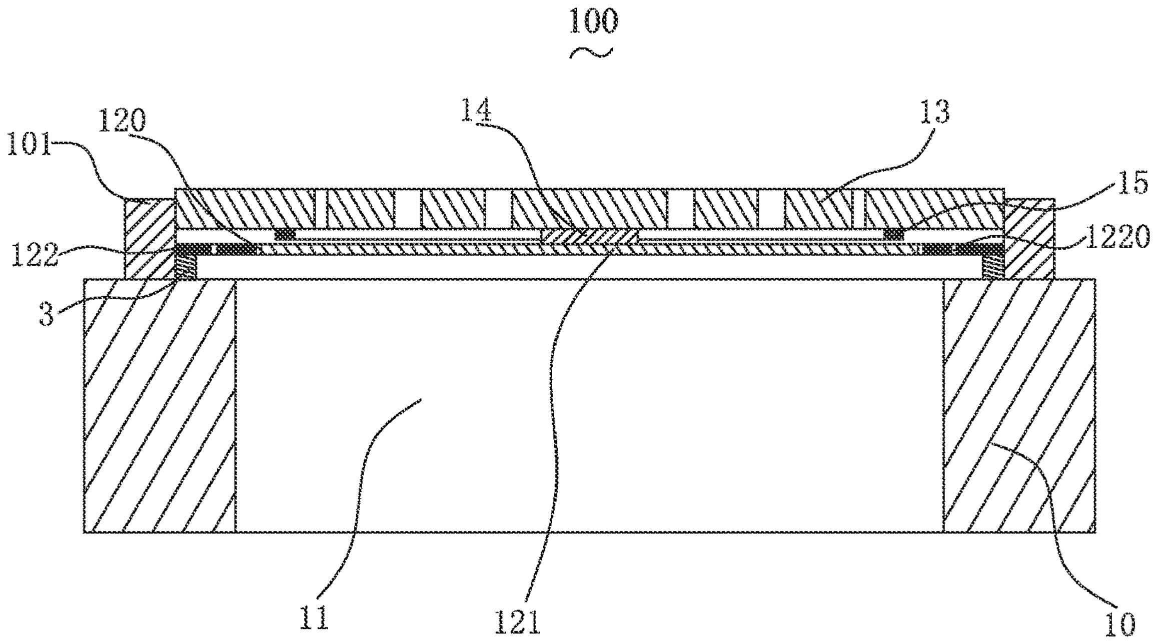
FIG. 3 is a cross-sectional view of the MEMS microphone taken along line AA in FIG. 1.
Figure 4:
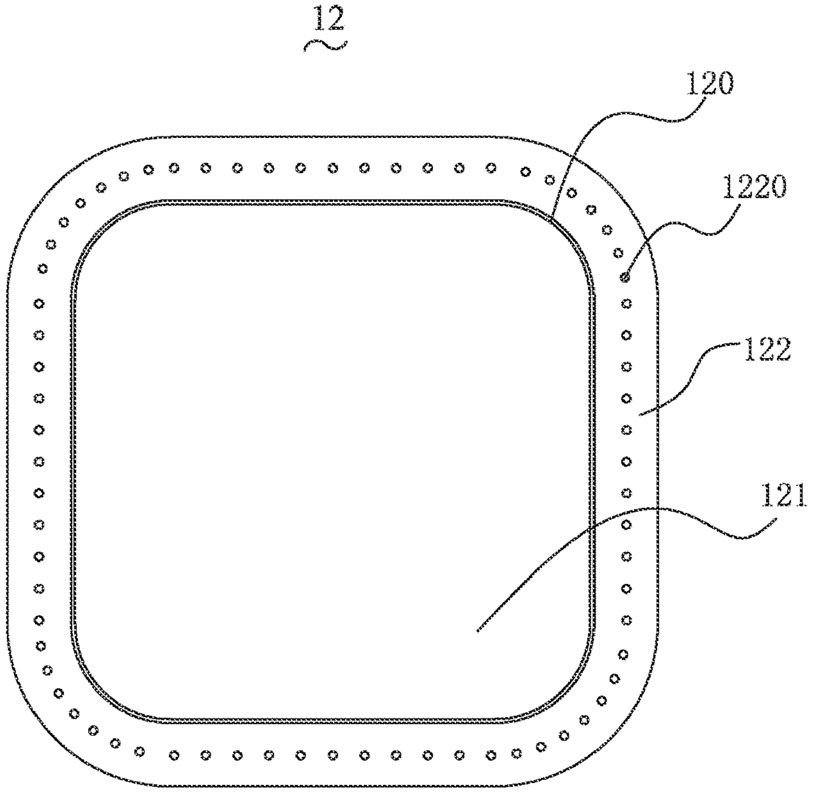
FIG. 4 is a diaphragm of the MEMS microphone in accordance with the first embodiment.

The present disclosure will hereinafter be described in detail with reference to exemplary embodiments. To make the technical problems to be solved, and technical solutions and beneficial effects of the present disclosure more apparent, the present disclosure is described in further detail together with the figure and the embodiment. It should be understood the specific embodiment described hereby is only to explain the disclosure, not intended to limit the disclosure.

First Embodiment

Referring to FIG. 1, FIG. 2, FIG. 3 and FIG. 4, this embodiment provides a MEMS microphone 100, including a substrate 10 with a back cavity 11 and a capacitive system 32 arranged on the substrate 10. The capacitive system 32 includes a back plate 13 and a diaphragm 12 opposite to the back plate 13, the diaphragm 12 is located on a side of the back plate 13 close to the substrate 10. When the sound pressure acts on the diaphragm 12, there is a pressure difference between the two sides of the diaphragm 12 facing the back plate 13 and the diaphragm 12 away from the back plate 13, so that the diaphragm 12 moves closer to the back plate 13 or away from the back plate 13, thereby causing the diaphragm 12 to move, the change of the capacitance with the back plate 13 realizes the conversion of the sound signal to the electrical signal.

The diaphragm 12 is in a shape of a racetrack, and includes a vibrating portion 121, and a fixing portion 122 surrounding the vibrating portion 121 and fixed to the substrate 10. The vibration portion 121 and the fixing portion 122 are spaced apart from each other by a slit 120, the slit 120 has a continuous annular structure. The slit 120 is used to adjust the low attenuation value of the MEMS microphone 100, thereby adjusting the performance of the MEMS microphone 100. A support member 14 is located between the vibration portion 121 and the back plate 13, and the vibration portion 121 is fixedly connected to the back plate 13 through the support member 14.

The fixing portion 122 is provides with a plurality of releasing portions 1220, and each releasing portion 1220 penetrates through the fixing portion 122. During the manufacturing process of the MEMS microphone 100, an oxide etching solution can enter the diaphragm 12 through the releasing portion 1220, so as to remove the oxide between the diaphragm 12 and the back plate 13 and to improve the reliability of the back plate 13.

A plurality of through holes forms the releasing portions 1220, and the plurality of through holes 1220 is evenly distributed in the fixing portion 122. In this embodiment, the cross section of the through hole 1220 perpendicular to the vibration direction of the diaphragm 12 is circular, that is, the through hole 122 is a circular hole.

In addition, the back plate 13 is further provided with a blocking portion 15 on the side close to the diaphragm 12, the edge of the back plate 13 is fixed to the substrate 10 by connecting with the inner side of the connecting portion 101, and the diaphragm 12 is fixed to the substrate 10 by an insulating layer 3.

Second Embodiment

Figure 5:
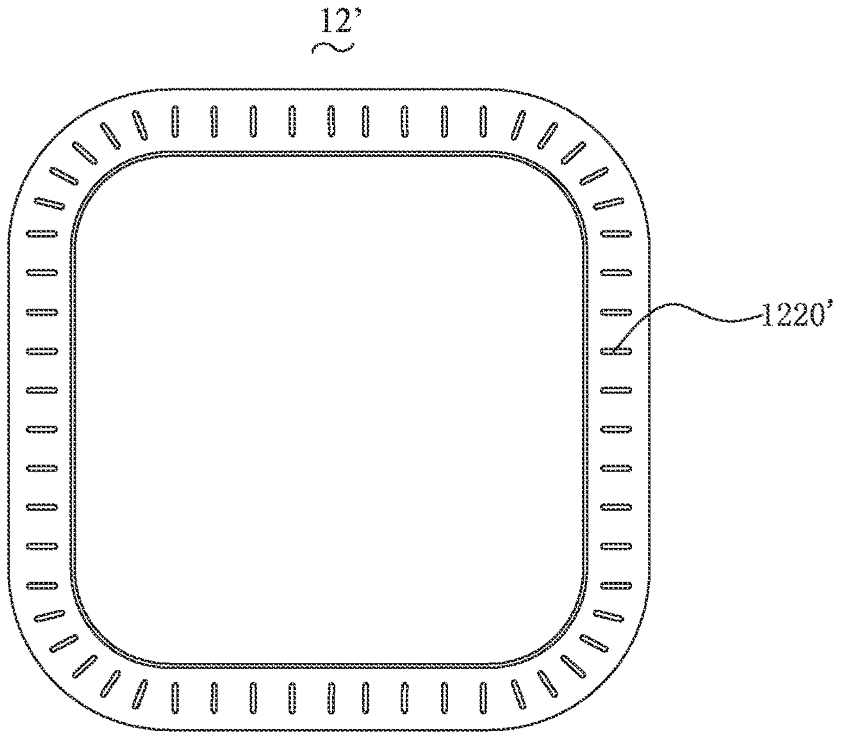
FIG. 5 is a diaphragm of the MEMS microphone in accordance with a second embodiment.

Referring to FIG. 5, a diaphragm 12' of a MEMS microphone is provided by the second embodiment. The distinction between the second embodiment and the first embodiment is that, the section of each through hole 1220' perpendicular to the vibration direction of the diaphragm 12' is elliptical, that is, the through hole 1220' is elliptical, and the oval through hole 1220' extends toward the center of the diaphragm 12".

Third Embodiment

Figure 6:
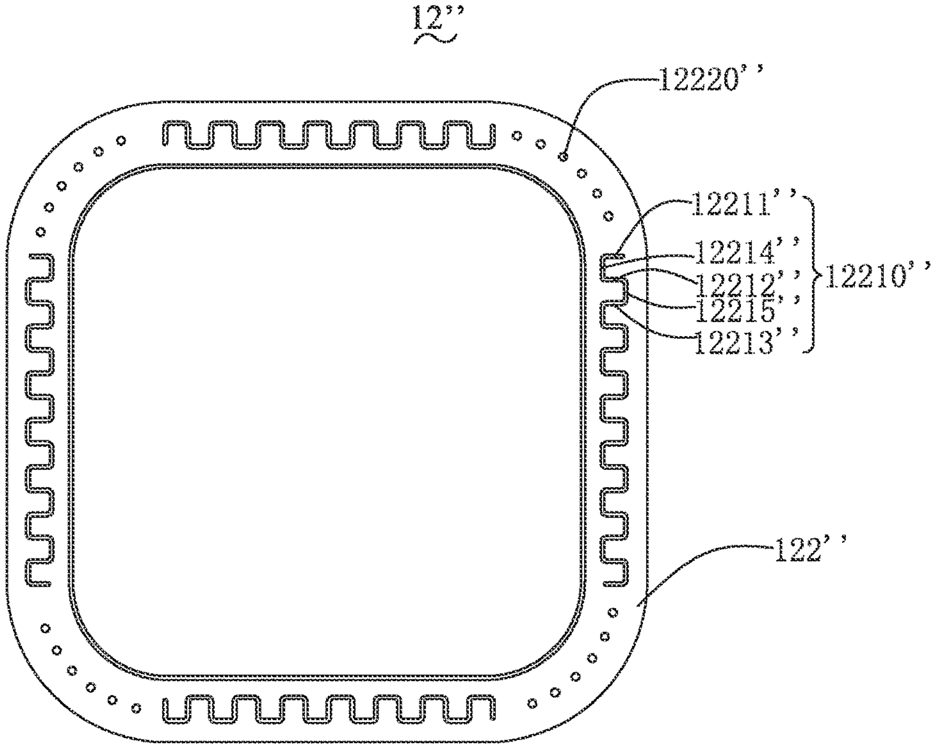
FIG. 6 is a diaphragm of the MEMS microphone in accordance with a third embodiment.

Referring to FIG. 6, a diaphragm 12" of a MEMS microphone is provided by the third embodiment. The distinction between the third embodiment and the first embodiment is that, the circular holes 12220" are only arranged at the corners of the fixing portion 122", and a plurality of through portions 12210" which communicates with each other in sequence is located on a long axis side and a short axis side of the diaphragm 12". Each through portion 12210" comprises a first through portion 12211", a second through portion 12212", a third through portion 12213", a fourth through portion 12214" that communicates with the first through portion 12211" and the second through portion 12212", and a fifth through portion 12215" that communicates with the second through portion 12212" and the third through portion 12213", the fourth through portion 12214" and the fifth through portion 12215" are respectively located on both sides of the second through portion 12212". In this embodiment, the first through portion 12211", the second through portion 12212" and the third through portion 12213" are parallel to each other, the fourth through portion 12214" and the fifth through portion 12215" are parallel to each other, the fourth through portion 12215" and the fifth through portion 12215" are perpendicular to the second through portion 12212".

It can be seen that compared with the related art, since the diaphragm is provided with several releasing portion, the oxide etchant can enter the diaphragm through the releasing portion, so as to remove the oxide between the diaphragm and the back plate, and to improve the reliability of the back plate.

It is to be understood, however, that even though numerous characteristics and advantages of the present exemplary embodiment have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A MEMS microphone, comprising:

a substrate comprising a back cavity;

a capacitive system arranged on the substrate, the capacitive system comprising a back plate and a diaphragm opposite to the back plate; wherein the diaphragm comprises a vibration portion and a fixing portion surrounding the vibration portion and fixed to the substrate, the vibration portion and the fixing portion are spaced apart from each other by a slit, the fixing portion comprises a plurality of releasing portions, and the releasing portions pass through the fixing portion.

2. The MEMS microphone as described in claim 1, wherein a plurality of through holes forms the releasing portions, and the plurality of through holes is evenly distributed in the fixing portion.

3. The MEMS microphone as described in claim 2, wherein a cross section of each through hole perpendicular to a vibration direction of the diaphragm is circular.

4. The MEMS microphone as described in claim 2, wherein a cross section of each through hole perpendicular to a vibration direction of the diaphragm is elliptical.

5. The MEMS microphone as described in claim 4, wherein each through hole extends toward a center of the diaphragm.

6. The MEMS microphone as described in claim 2, wherein each through hole comprises a plurality of through portions which communicates with each other in sequence, each through portion comprises a first through portion, a second through portion, a third through portion, a fourth through portion that communicates with the first through portion and the second through portion, and a fifth through portion that communicates with the second through portion and the third through portion, the fourth through portion and the fifth through portion are respectively located on both sides of the second through portion.

7. The MEMS microphone as described in claim 6, wherein the first through portion, the second through portion and the third through portion are parallel to each other.

8. The MEMS microphone as described in claim 7, wherein the fourth through portion and the fifth through portion are perpendicular to the second through portion.

9. The MEMS microphone as described in claim 6, wherein the diaphragm is in a shape of a racetrack, corners of the fixing portion are provided with a plurality of circular holes, and the through portions are located on a long axis side and a short axis side of the diaphragm.

10. The MEMS microphone as described in claim 1, wherein the diaphragm is located on a side of the back plate close to the substrate.

* * * * *